A. F. AND C. J. R. POSTEL.
BOLT LOCK.
APPLICATION FILED AUG. 20, 1920.
1,387,172.
Patented Aug. 9, 1921.
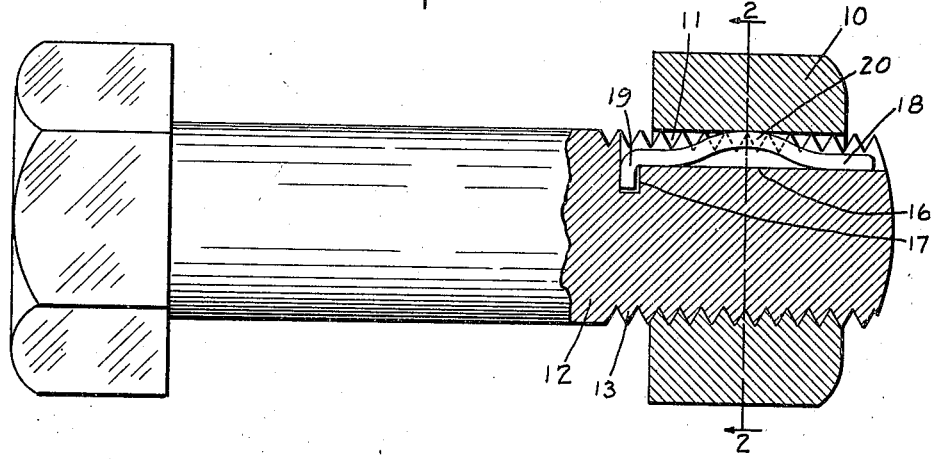
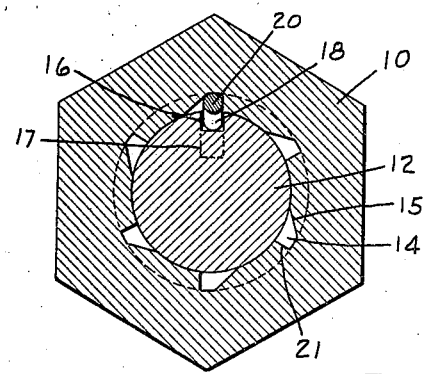
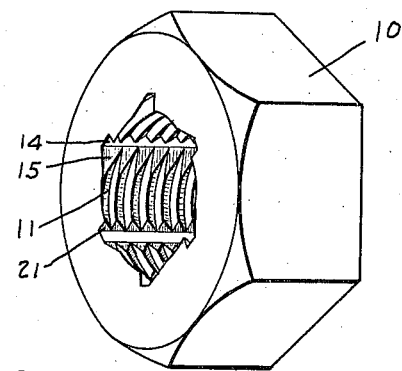
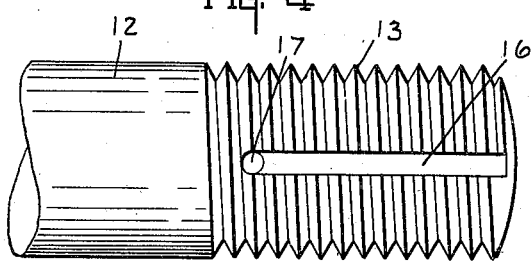
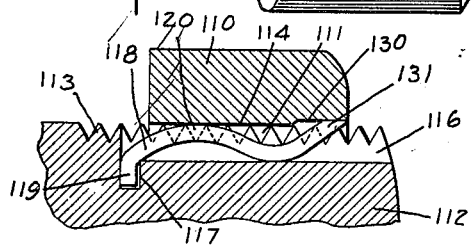
INVENTORS.
CHARLES J.R. POSTEL.
ARTHUR F. POSTEL.
BY
Lockwood Lockwood
ATTORNEYS.

UNITED STATES PATENT OFFICE.

ARTHUR F. POSTEL AND CHARLES J. R. POSTEL, OF INDIANAPOLIS, INDIANA, ASSIGNORS OF ONE-FOURTH TO HARRY C. KROM AND CHARLES D. LOCKMAN, BOTH OF INDIANAPOLIS, INDIANA.

BOLT-LOCK.

1,387,172.   Specification of Letters Patent.   Patented Aug. 9, 1921.

Application filed August 20, 1920. Serial No. 404,734.

*To all whom it may concern:*

Be it known that we, ARTHUR F. POSTEL and CHARLES J. R. POSTEL, citizens of the United States, and residents of Indianapolis, county of Marion, and State of Indiana, have invented a certain new and useful Bolt-Lock; and we do hereby declare that the following is a full, clear, and exact description thereof, reference being had to the accompanying drawings, in which like numerals refer to like parts.

This invention relates to means for locking a male and female threaded member in the adjusted position. The chief object of this invention is to provide a single means associated with a male and female threaded member for locking said members in the adjusted position and for yieldingly maintaining said members in said position such that subsequent adjustment can readily be made.

The chief feature of the invention consists in providing a resilient spring locking tongue or key member seatable in one of said members and yieldingly engaging the other of the threaded members, so that said last mentioned threaded member may be rotated freely in one direction and is prevented from reverse rotation.

The full nature of this invention will be understood from the accompanying drawings and the following description and claim.

In the drawings, Figure 1 is a side elevational view of the invention when applied to a bolt and nut, said nut and a portion of the bolt coöperating therewith being shown in section to clearly illustrate the invention. Fig. 2 is a cross sectional view of the foregoing members taken on the line 2—2 of Fig. 1 and in the direction of the arrows. Fig. 3 is a perspective view of the nut. Fig. 4 is a side elevational view of a portion of the bolt and shows a tongue receiving groove or seat. Fig. 5 is a sectional view of a modified form of the invention.

In the drawings 10 indicates a nut member interiorly threaded at 11, and 12 indicates a bolt member exteriorly threaded at 13. The nut member 10 is provided with a plurality of plots 14, said slots extending axially of the nut and in spaced relation with each other about the periphery of the internally threaded opening. One of the sides of each slot 14 is preferably inclined, tapered, or beveled, as at 15, said slots being formed by broaching the same in the usual manner.

The bolt member 12 is provided with a single axially extending slot or groove 16, said groove terminating in a hole or depression 17 near the end of the threaded portion, as shown in Fig. 4.

The locking means associated with the male and female threaded member herein illustrated by the bolt and nut 12 and 10 respectively is a tongue clip, key latching member 18, said member being provided at one end with an angularly extending projection 19. As shown clearly in Fig. 1, the tongue or key member 18 is seatable in the slot 16 and the angularly extending end 19 of said tongue is seatable in the hole or depression 17 communicating with the slot or groove 16. As shown clearly in Fig. 1 the key member 18 is provided with a curved portion 20, said curved portion being formed by suitably bending the body portion 18 of the key. The curved portion 20, as shown clearly in Figs. 1 and 2, is adapted to project outwardly into the slot 14. Since the body portion of said tongue and key member is seatable in the groove 16 and the tongue is positively secured to the bolt by means of the depression 17 and angular end 19, it will be understood that said curved portion 20 is adapted to abut the substantially straight wall 21 of the grooves 14 so as to prevent reverse rotation and removal of the nut member from the bolt member. As shown clearly in Figs. 2 and 3 the tapered wall 15 of the slot 14 permits the nut member 10 to be rotated clockwise to screw said nut upon the bolt. In this movement the tapered wall 15 cams the curved portion 20 out of registration with the slot 14 and forces the same into the groove 16 so as to permit said nut to be rotated upon said bolt. Thus, the nut may be rotated until the same is properly positioned upon the bolt, whereupon the curved portion 20 registers with one of the slots 14 and locks said nut upon said bolt.

In Fig. 5 is illustrated a modified form of the invention wherein the nut is indicated by the numeral 110 and threads thereof by 111, the bolts by 112, threads thereof by 113, the bolt slot by 116, the depression by 117 and the key member by 118, said key member having the angular end 119 seatable in the hole or depression 117, and the outwardly extending curved portion 120, all of which is substantially identical with the modification shown in Figs. 1 to 4 inclusive. In addition to the foregoing the nut 110 is provided with a plurality of slots or grooves 130 which slots or grooves are preferably deeper than the slots or grooves 114. The slots 130 and 114 are adapted to register as shown in Fig. 5 and associated with the deeper slot 130 is an outwardly extending and flat faced end 131 formed upon and integral with the tongue or key member 118.

While the invention has been described in considerable detail in the foregoing specifications it will be understood that several modifications thereof will readily suggest themselves to those skilled in the art, and the breadth of the invention is not to be limited by details of description, but reference is to be had to the appended claim for the scope thereof.

The invention claimed is:

A locking device for male and female threaded members, each of said members being provided with an axially extending groove, said grooves being adapted to register with each other, and a resilient key member seatable in one of said grooves and adapted to project into the registering groove to lock the male and female threaded members together, said key member being provided with an angular end, and said key seating groove being provided with a depression to receive said key end to positively secure said key in said key-seating groove, said registering groove being provided with a cut-away portion and said key member being provided with an angularly extending portion seatable in said cut-away portion of said registering groove.

In witness whereof, we have hereunto affixed our signatures.

ARTHUR F. POSTEL.
CHARLES J. R. POSTEL.